United States Patent
Inagaki (10) Patent No.: US 8,005,574 B2
(45) Date of Patent: Aug. 23, 2011

(54) VIBRATION SUPPRESSING METHOD AND DEVICE

(75) Inventor: Hiroshi Inagaki, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 115 days.

(21) Appl. No.: 12/493,494

(22) Filed: Jun. 29, 2009

(65) Prior Publication Data

US 2010/0010662 A1 Jan. 14, 2010

(30) Foreign Application Priority Data

Jul. 8, 2008 (JP) .................................. 2008-178300
Oct. 24, 2008 (JP) .................................. 2008-274611

(51) Int. Cl.
*G05B 21/00* (2006.01)
*G05B 13/00* (2006.01)
*G05B 15/00* (2006.01)
*G01M 1/38* (2006.01)
*G05D 23/00* (2006.01)

(52) U.S. Cl. ............ 700/280; 700/279; 702/56; 73/597; 73/659; 73/660

(58) Field of Classification Search .......... 700/279–280; 702/56; 73/597, 659–660
See application file for complete search history.

(56) References Cited

U.S. PATENT DOCUMENTS

| | | | | |
|---|---|---|---|---|
| 4,025,724 | A * | 5/1977 | Davidson et al. | 381/71.2 |
| 4,435,751 | A * | 3/1984 | Hori et al. | 700/280 |
| 6,085,121 | A | 7/2000 | Stern | |
| 6,223,102 | B1 * | 4/2001 | Busch | 700/279 |
| 6,697,759 | B2 * | 2/2004 | Saarinen et al. | 702/145 |
| 6,748,300 | B2 * | 6/2004 | Sato | 700/304 |
| 6,883,373 | B2 * | 4/2005 | Dyer | 73/462 |
| 7,155,973 | B2 * | 1/2007 | Dyer | 73/462 |
| 7,381,017 | B2 * | 6/2008 | Wang et al. | 409/131 |
| 7,501,783 | B2 * | 3/2009 | Imadu et al. | 318/611 |
| 7,540,697 | B2 * | 6/2009 | Wang et al. | 409/141 |
| 2005/0160811 | A1 * | 7/2005 | Dyer | 73/462 |
| 2008/0289923 | A1 * | 11/2008 | Suzuki et al. | 188/379 |
| 2009/0069927 | A1 * | 3/2009 | Suzuki et al. | 700/177 |
| 2010/0010662 | A1 * | 1/2010 | Inagaki | 700/175 |
| 2010/0104388 | A1 * | 4/2010 | Suzuki et al. | 409/131 |

FOREIGN PATENT DOCUMENTS

JP 2001-517557 A1 10/2001
JP 2003-340627 A1 12/2003

* cited by examiner

*Primary Examiner* — Ramesh B Patel
(74) *Attorney, Agent, or Firm* — Burr & Brown (57) ABSTRACT

A stable rotation speed is acquired by finely changing a rotation speed of a rotary shaft 3 based on an expected stable rotation speed, and calculating an amount of change of a k' number, and the like. Therefore, a more accurate rotation speed can be acquired, and "chatter vibration" generated during machining can be suppressed more effectively than a conventional method. As a result, a quality of a workpiece surface can be improved, and a tool wear and the like can be suppressed.

8 Claims, 11 Drawing Sheets

VIBRATION SUPPRESSING METHOD AND DEVICE

This application claims the benefit of Japanese Patent Application Numbers 2008-178300 filed on Jul. 8, 2008 and 2008-274611 filed on Oct. 24, 2008, the entirety of which is incorporated by reference.

BACKGROUND OF THE INVENTION

1. Field of the Invention

The present invention relates to a method for suppressing vibration generated during machining in a machine tool for performing machining while rotating a tool or a work, and a vibration suppressing device capable of executing this method.

2. Description of the Related Art

As for a vibration suppressing method of a machine tool, for example, a method disclosed in Japanese Unexamined Patent Publication No. 2003-340627 is conventionally known. According to this vibration suppressing method, in order to suppress regenerative type chatter vibration as self-excited vibration causing a low finishing workpiece surface roughness, a characteristic frequency of a system generating chatter vibration is obtained, e.g., a tool, a work, or the like, multiplying the characteristic frequency with 60, and dividing the multiplied value by the number of the tool flutes and a predetermined integer to be defined as a stable rotation speed. Then, by performing machining at this stable rotation speed, chatter vibration generated during machining is suppressed. In addition, the characteristic frequency is acquired by subjecting the tool or the work to impulse excitation.

Further, a vibration suppressing method disclosed in Japanese Translation of PCT No. 2001-517557 is also known. According to this vibration suppressing method, a chatter frequency of a system generating chatter vibration during machining is obtained, multiplying the chatter frequency with 60, and dividing the multiplied value by the number of the tool flutes and a predetermined integer to be defined as a stable rotation speed. By performing machining at this stable rotation speed, chatter vibration is intended to be suppressed. In addition, as for the chatter frequency during machining, a sound sensor is provided near the tool or the work, and the chatter frequency is acquired based on a vibration frequency detected by the sound sensor during rotation.

SUMMARY OF THE INVENTION

However, as for the vibration suppressing method disclosed in Japanese Unexamined Patent Publication No. 2003-340627, an impulse device with high cost is necessary. Further, a high technique is required for an excitation using this device, and it takes time and effort. Furthermore, since a characteristic frequency acquired before machining does not necessarily coincide with a characteristic frequency generated during machining, there is a problem that an accurate stable rotation speed is hardly acquired.

On the other hand, as for the vibration suppressing method disclosed in Japanese Translation of PCT No. 2001-517557, a value of a chatter frequency acquired by analyzing a rotation sound or the like is slightly different from a value of a characteristic frequency, so that an accurate stable rotation speed is also hardly acquired. Another vibration suppressing device intends to obtain a more accurate chatter frequency by providing a detection unit adapted to detect a time-domain vibration of a rotary shaft during rotation and a calculating unit adapted to calculate chatter frequency and the like based on the time-domain vibration, and an optimum stable rotation speed (for example, Japanese Patent Application No. 2007-138166). However, as for this vibration suppressing device, there might be a calculation discrepancy between the characteristic frequency calculated during machining by the calculating unit and the actual characteristic frequency due to an error of the calculation formula, and thus a situation that the chatter vibration is continued to be generated even when the rotary shaft is made to have the stable rotation speed might be considered.

The present invention is to provide a vibration suppressing method and a device capable of acquiring a more accurate stable rotation speed in the case where chatter vibration is continued to be generated and capable of securely suppressing the chatter vibration.

In order to achieve the above described object, a first aspect of the present invention relates to a vibration suppressing method for suppressing chatter vibration generated upon rotation of a rotary shaft in a machine tool including the rotary shaft for rotating a tool or a work, and the method includes: a first step for detecting a time-domain vibration due to the rotary shaft during rotation; a second step for calculating a chatter frequency and a frequency-domain vibrational acceleration at the chatter frequency based on the detected time-domain vibration; a third step for calculating a k number and a k' number by following calculation formulae (1) and (2) in the case where the calculated frequency-domain vibrational acceleration exceeds a predetermined threshold value and storing these numbers as machining information; a fourth step for calculating an expected stable rotation speed by following calculation formula (3) using the calculated k number and for corresponding a rotation speed of the rotary shaft to the expected stable rotation speed; and a fifth step for changing the rotation speed of the rotary shaft from the expected stable rotation speed in the case where the frequency-domain vibrational acceleration exceeds again a predetermined threshold value in the rotary shaft during rotation at the expected stable rotation speed.

k' number={60×chatter frequency/(the number of tool flutes×rotation speed)}     Calculation formula (1):

k number=integer part of k' number     Calculation formula (2):

Expected stable rotation speed=60×chatter frequency/ {the number of tool flutes× (k number+1)}     Calculation formula (3):

It should be noted that the "vibration" detected by the first step includes not only vibration itself, such as a vibrational acceleration, displacement due to vibration, sound pressure due to vibration, or the like but also a physical change which is generated at the rotary shaft due to vibration. The physical change can be indirectly detected with vibration.

A second aspect of the invention relates to the vibration suppressing method in the first aspect of the invention, and the method includes a sixth step for calculating a k" number by the same calculation formula as calculation formula (1) using the changed rotation speed in the case where the frequency-domain vibrational acceleration further exceeds the predetermined threshold value after executing the fifth step; a seventh step for comparing an amount of change, which is a difference between the calculated k" number and the k' number stored as machining information, with a predetermined phase threshold value, and updating the k" number as the k' number in the case where the amount of change does not exceed the phase threshold value; and an eighth step for repeating the change of the rotation speed, the calculation of the k" number, and the update of the k' number until the amount of change exceeds the phase threshold value, and keeping the rotation speed when the amount of change exceeds the phase threshold value as the stable rotation speed.

A third aspect of the invention relates to the vibration suppressing method in the first aspect of the invention, and the method includes a step for storing a chatter frequency when the frequency-domain vibrational acceleration exceeds the predetermined threshold value as machining information in the third step; and a step for acquiring an amount of change between a current chatter frequency and the chatter frequency stored as the machining information in the case where the frequency-domain vibrational acceleration further exceeds the predetermined threshold value after executing the fifth step, for changing the rotation speed until the amount of change exceeds a predetermined phase threshold value, and for keeping the rotation speed when the amount of change exceeds the predetermined phase threshold value as the stable rotation speed.

A fourth aspect of the invention relates to the vibration suppressing method in any one of the first to third aspects of the invention, the method includes comparing a decimal part of the k' number with a predetermined changing-direction determining threshold value, and determining an increase and decrease of the rotation speed upon changing of the rotation speed in the fifth step.

A fifth aspect of the invention relates to a vibration suppressing device for suppressing chatter vibration generated upon rotation of the rotary shaft in a machine tool including the rotary shaft for rotating a tool or a work, and the device includes: a detection unit adapted to detect a time-domain vibration of the rotary shaft during rotation; a first calculating unit adapted to calculate a chatter frequency and a frequency-domain vibrational acceleration at the chatter frequency based on the detected time-domain vibration; a second calculating unit adapted to calculate a k number and a k' number by following calculation formulae (1) and (2), and calculating an expected stable rotation speed by following calculation formula (3) in the case where the calculated frequency-domain vibrational acceleration exceeds a predetermined threshold value, respectively; a storage unit adapted to store the k number and the k' number as machining information; and a rotation speed control unit adapted to control the rotation speed of the rotary shaft. In the case where the frequency-domain vibrational acceleration exceeds again the predetermined threshold value in the rotary shaft during rotation at the expected stable rotation speed calculated by the second calculating unit, the device changes the rotation speed of the rotary shaft from the expected stable rotation speed.

$$k' \text{ number} = \{60 \times \text{chatter frequency}/(\text{the number of tool flutes} \times \text{rotation speed})\} \quad \text{Calculation formula (1):}$$

$$k \text{ number} = \text{integer part of } k' \text{ number} \quad \text{Calculation formula (2):}$$

$$\text{Expected stable rotation speed} = 60 \times \text{chatter frequency}/\{\text{the number of tool flutes} \times (k \text{ number} + 1)\} \quad \text{Calculation formula (3):}$$

In addition, the "vibration" detected by the detection unit in the fifth aspect of the invention is the same meaning as that of the "vibration" described in the first aspect of the invention.

A sixth aspect of the present invention relates to a vibration suppressing method for suppressing chatter vibration in a machine tool including the rotary shaft for rotating a tool or a work by changing a rotation speed of a rotary shaft upon generation of chatter vibration at the rotary shaft during rotation, and the method includes: a step A for detecting a time-domain vibration due to the rotary shaft during rotation; a step B for calculating a chatter frequency and a frequency-domain vibrational acceleration at the chatter frequency based on the detected time-domain vibration; a step C for calculating a phase $\epsilon 1$ by following calculation formula (4) in the case where the calculated frequency-domain vibrational acceleration exceeds a predetermined threshold value, and for storing the values as machining information; a step D for comparing the calculated phase $\epsilon 1$ with a phase $\epsilon 0$ calculated by calculation formula (4) in a same way as calculating the phase $\epsilon 1$ and stored in the case where a vibrational acceleration previously exceeds a predetermined threshold value; and a step E for changing a rotation speed of the rotary shaft according to the comparison result by the step D.

$$\text{Phase } \epsilon 1 = \text{decimal part of } \{60 \times \text{a chatter frequency}/(\text{the number of tool flutes} \times \text{rotation speed})\} \quad \text{Calculation formula (4):}$$

A seventh aspect of the invention relates to the vibration suppressing method in the sixth aspect of the invention, and the method includes: updating and storing the calculated phase $\epsilon 1$ as the phase $\epsilon 0$ in the step E in the case where the calculated phase $\epsilon 1$ is smaller than the phase $\epsilon 0$ previously calculated as a result of the comparison in the step D, and changing the rotation speed of the rotary shaft by a predetermined amount of change; or changing the previous rotation speed of the rotary shaft into the rotation speed at a time of calculating the phase $\epsilon 0$ in the step E in the case where the calculated phase $\epsilon 1$ is equal to or larger than the phase $\epsilon 0$ previously calculated as a result of the comparison in the step D.

An eighth aspect of the invention relates to a vibration suppressing device for suppressing chatter vibration in a machine tool including the rotary shaft for rotating a tool or a work by changing a rotation speed of a rotary shaft upon generation of chatter vibration at the rotary shaft during rotation, the device includes: a detection unit adapted to detect a time-domain-vibration due to the rotary shaft during rotation; a calculating unit A adapted to calculate a chatter frequency and a frequency-domain vibrational acceleration at the chatter frequency based on the detected time-domain vibration; a calculating unit B adapted to calculate a phase $\epsilon 1$ by following calculation formula (4) in the case where the calculated frequency-domain vibrational acceleration exceeds a predetermined threshold value; a storage unit adapted to store a phase $\epsilon 0$ calculated by the calculating unit B with calculation formula (4) in a same way as calculating the phase $\epsilon 1$ when the vibrational acceleration previously exceeds the predetermined threshold value; a control unit adapted to compare the calculated phase $\epsilon 1$ with the phase $\epsilon 0$ stored in the storage unit upon calculation of the phase $\epsilon 1$ by the calculating unit B, and commanding a change of the rotation speed of the rotary shaft according to a result of the comparison; and a rotation speed control unit adapted to control the rotation speed of the rotary shaft.

$$\text{Phase } \epsilon 1 = \text{decimal part of } \{60 \times \text{chatter frequency}/(\text{the number of tool flutes} \times \text{rotation speed}) \quad \text{Calculation formula (4):}$$

According to the first to the fifth aspects of the present invention, when the "chatter vibration" is generated again at a rotary shaft during rotation at an expected stable rotation speed, a rotation speed of the rotary shaft is changed based on the expected stable rotation speed so as to correspond to the chatter vibration. Thus, the "chatter vibration" that is continuously generated can be suppressed more effectively than a conventional method, which improves a quality of a workpiece surface and effectively suppresses a tool wear.

Further, the stable rotation speed is determined by acquiring an amount of change of a k' number and an amount of change of a chatter frequency when the rotation speed is changed, comparing these amounts of change with a phase threshold value, and the like. Consequently, a more accurate stable rotation speed can be acquired and the "chatter vibration" can be suppressed effectively.

According to the sixth to the eighth aspects of the present invention, when a "chatter vibration" is generated, calculating the phase ε1 at the rotation speed and comparing the calculated phase ε1 with the phase ε0 at the rotation speed when the vibrational acceleration previously exceeds a predetermined threshold value, the rotation speed of the rotary shaft is changed according to the result of comparison. Therefore, a response according to a situation can be made, and an influence of a "regenerative chatter vibration" can be suppressed.

Particularly, comparing the phase ε1 at the current rotation speed with the phase ε0 at the previous rotation speed, then, if the phase ε1 is equal to or larger than the phase ε0, the rotation speed is changed to the previous rotation speed (that is, the rotation speed at the time of calculating the phase ε0). Thus, machining can be performed at the rotation speed having a minimum phase value. Therefore, generation of the "regenerative chatter vibration" can be suppressed more effectively, which improves a quality of a workpiece surface and suppresses a tool wear.

BRIEF DESCRIPTION OF THE DRAWINGS

A vibration suppressing method and a device as one embodiment of the present invention will be described below referring to the drawings.

DETAILED DESCRIPTION OF THE EMBODIMENTS

A First Embodiment

Figure 1:
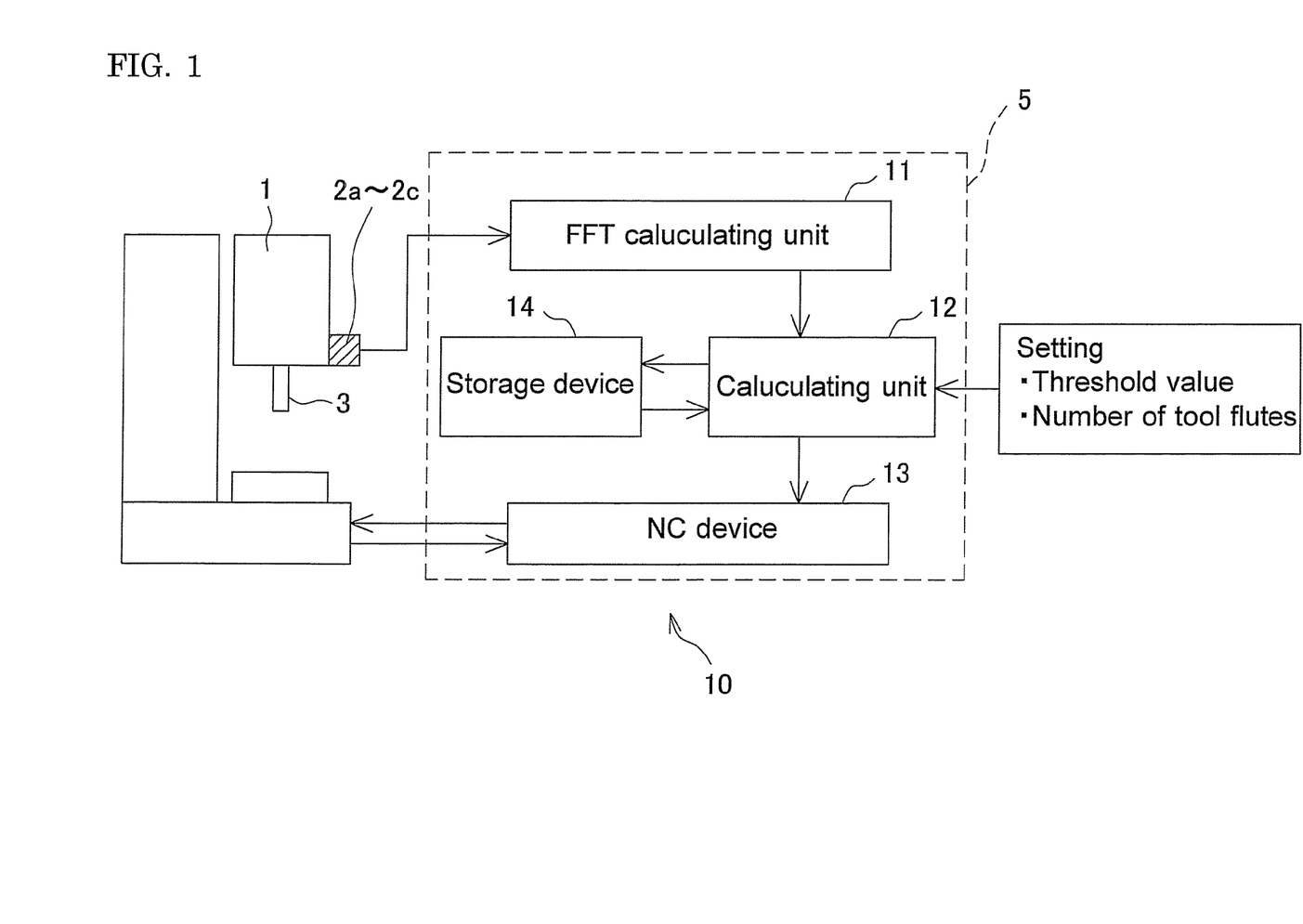
FIG. 1 is a block configuration explanatory view of a vibration suppressing device 10.

The vibration suppressing device 10 intends to suppress "chatter vibration" that is generated at a rotary shaft 3 rotatably provided around a C axis of the rotary shaft housing 1. The vibration suppressing device 10 includes vibration sensors (a detection unit) 2a to 2c for detecting a time-domain vibrational acceleration (it means a vibrational acceleration on a time axis) to be generated at the rotary shaft 3 during rotation, and a control device 5 for controlling a rotation speed of the rotary shaft 3 based on values detected by the vibration sensors 2a to 2c.

Figure 2:
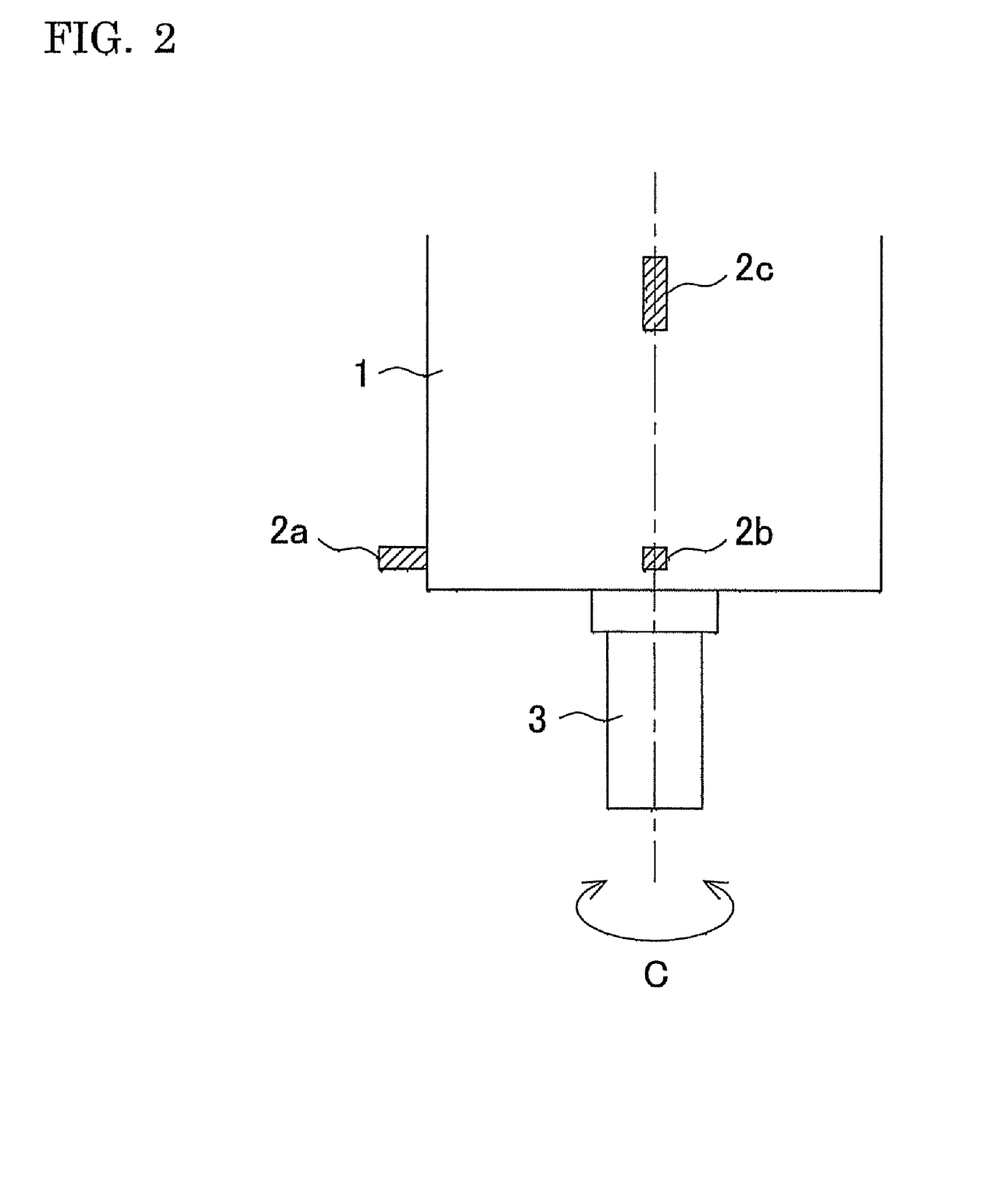
FIG. 2 is an explanatory view for illustrating a rotary shaft housing 1 to be subjected to vibration suppressing from a side direction.
Figure 3:
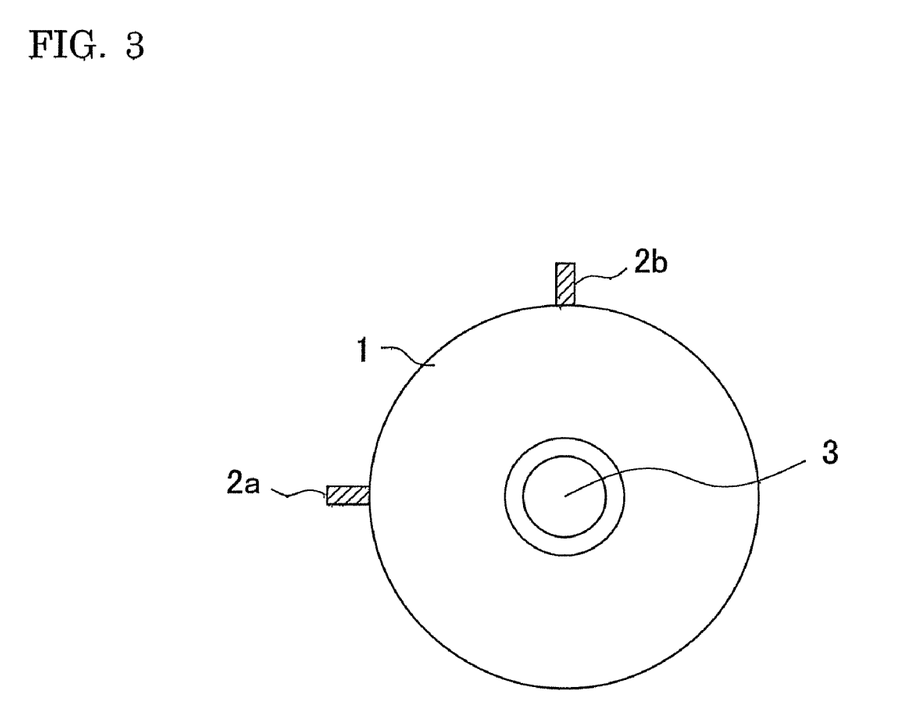
FIG. 3 is an explanatory view for illustrating the rotary shaft housing 1 from a shaft direction.

As illustrated in FIGS. 2 and 3, the vibration sensors 2a to 2c are mounted on the rotary shaft housing 1 in a state capable of detecting the time-domain vibrational accelerations in directions of an X axis, a Y axis, and a Z axis which are perpendicular to one another to detect the time-domain vibrational accelerations in the directions which are orthogonal to each other.

Further, the control device 5 includes an FFT calculating unit 11 for performing Fourier-analysis based on the time-domains vibrational accelerations detected by the vibration sensors 2a to 2c, a calculating unit 12 for calculating a stable rotation speed based on a value calculated by the FFT calculating unit 11, an NC device (a rotation speed control unit) 13 for controlling machining in the rotary shaft housing 1, and a storage unit 14 for storing various kinds of values calculated by the calculating unit 12. In addition, the NC device 13 monitors the rotation speed of the rotary shaft 3.

Here, a vibration suppressing method of "chatter vibration" with the vibration suppressing device 10 will be described referring to flowcharts in FIGS. 7 and 8.

Figure 7:
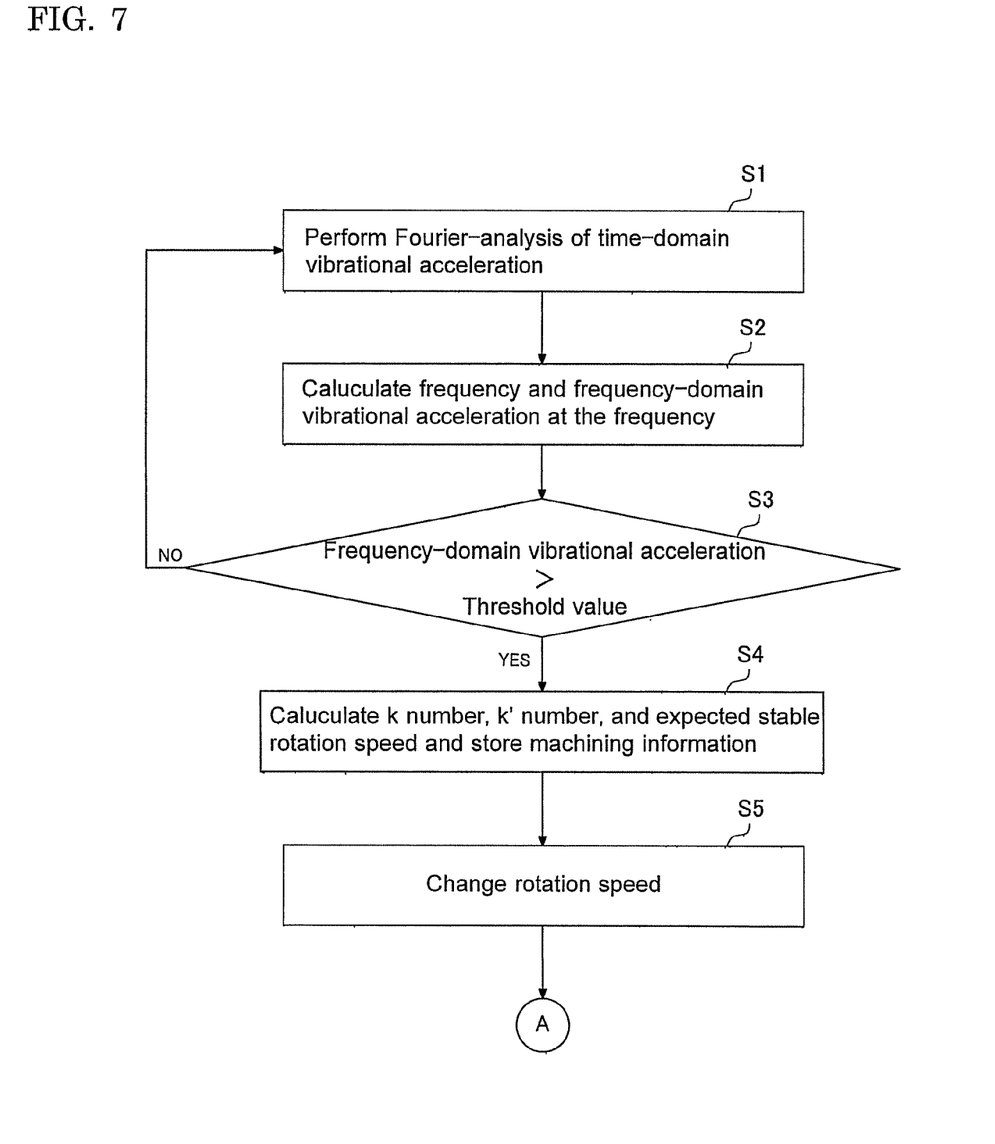
FIG. 7 is a flowchart according to control of chatter vibration suppressing.
Figure 8:
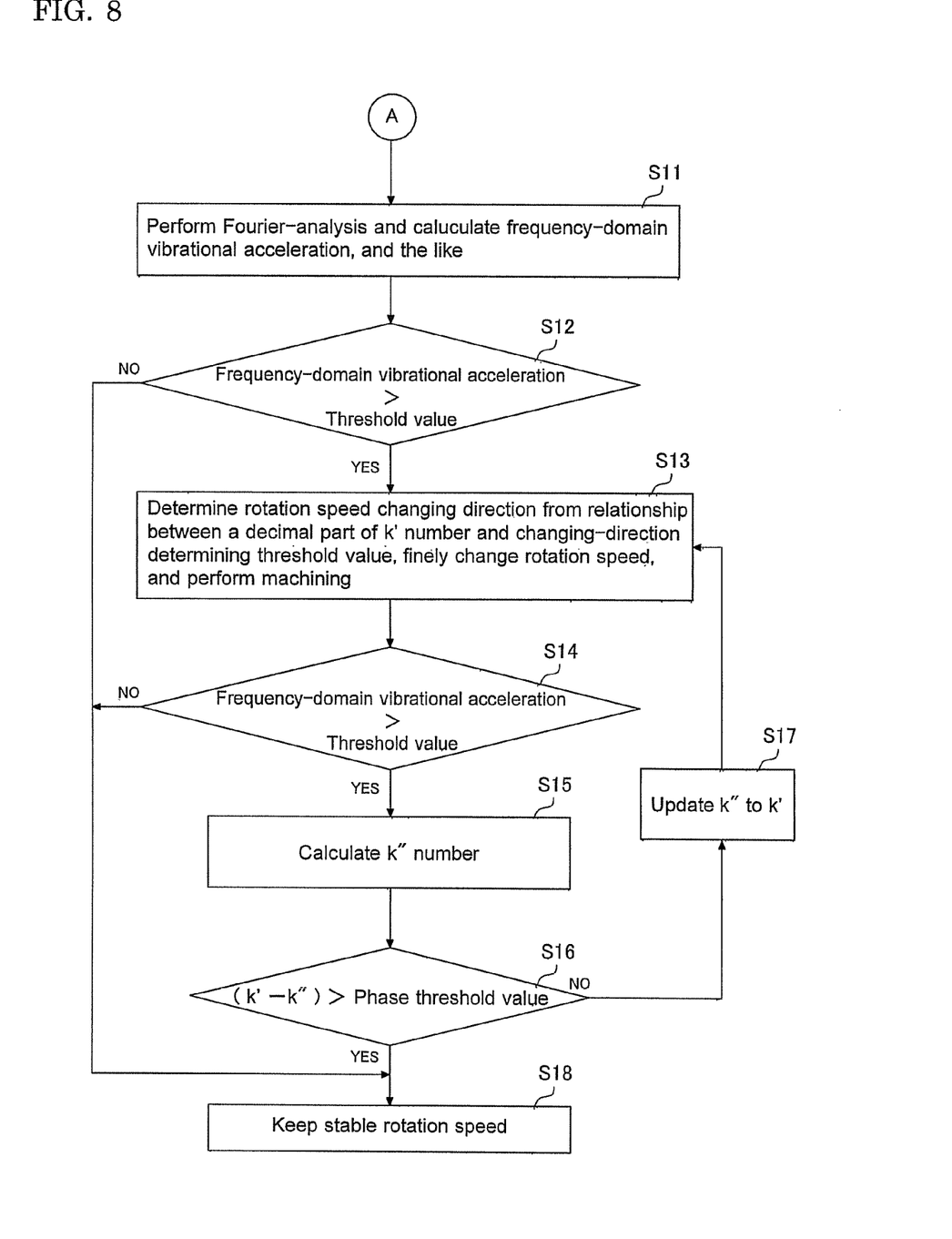
FIG. 8 is a flowchart according to control of chatter vibration suppressing.

At the beginning of machining, the control device 5 controls the rotating operation of the rotary shaft 3 based on the flowchart in FIG. 7.

Figure 4:
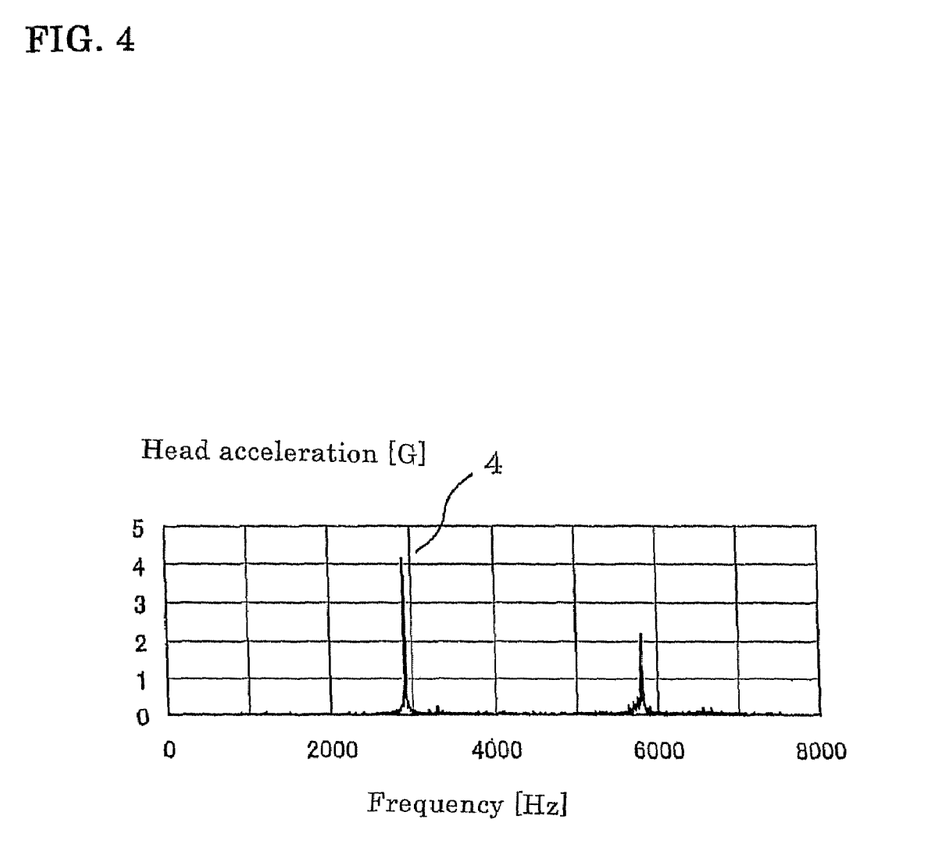
FIG. 4 is an explanatory view for illustrating one example of a result of Fourier-analysis of a time-domain vibrational acceleration.

First, the FFT calculating unit 11 performs Fourier-analysis of the time-domains vibrational accelerations which are constantly detected during the rotation of the rotary shaft 3 by the vibration sensors 2a to 2c (S1), and constantly calculates a maximum acceleration (a frequency-domain vibrational acceleration) and a frequency 4 (a chatter frequency) of the maximum acceleration as shown in FIG. 4 (S2). In addition, when the time-domain vibrational accelerations are subjected to Fourier-analysis, peaks having a plurality of patterns as illustrated in FIG. 4 are acquired. These peaks indicate a relationship between a frequency and a frequency-domain vibrational acceleration. In the present embodiment, a peak having the maximum frequency-domain vibrational acceleration is used.

Then, the calculating unit 12 compares the frequency-domain vibrational acceleration calculated in the FFT calculating unit 11 with a predetermined threshold value (S3). With an assumption of that "chatter vibration" to be suppressed is generated at the rotary shaft 3 in the case where the frequency-domain vibrational acceleration exceeds the predetermined threshold value (for example, the frequency-domain vibrational acceleration in the frequency 4 in FIG. 4 is detected), the calculating unit 12 calculates a k' number and a k number by following calculation formulae (1) and (2), and stores the frequency-domain vibrational acceleration (that is, the maximum acceleration) and the frequency 4 in addition to the k' number and the k number in the storage device 14 as machining information (S4). Further, the calculating unit 12 calculates an expected stable rotation speed by following calculation formula (3), outputs the expected stable rotation speed to the NC device 13, and changes the rotation speed of the rotary shaft 3 into the expected stable rotation speed (S5).

k' number={60×chatter frequency/(the number of tool flutes×rotation speed)}   Calculation formula (1):

k number=integer part of k' number   Calculation formula (2):

Expected stable rotation speed=60×chatter frequency/{the number of tool flutes×(k number+1)}   Calculation formula (3):

Here, "the number of the tool flutes" in calculation formulae (1) and (3) is previously set in the calculating unit 12. Further, "a rotation speed" in calculation formula (1) is a current rotation speed which is not changed to an expected stable rotation speed yet. Furthermore, a chatter frequency is the frequency 4 when "chatter vibration" is generated.

Figure 5:
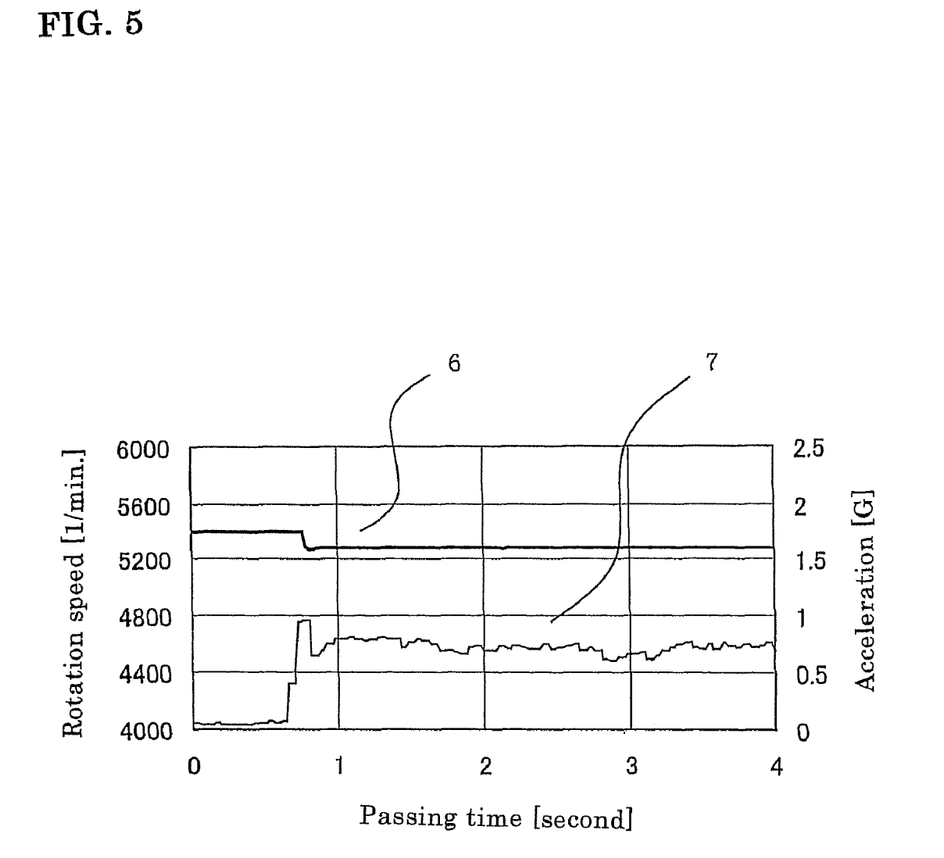
FIG. 5 is an explanatory view for illustrating a change of vibrational acceleration at a chatter frequency assuming that a rotation speed of a rotary shaft is an expected stable rotation speed.

When the rotary shaft 3 is rotated at the expected stable rotation speed calculated by the aforementioned method, the vibrational acceleration 7 in the chatter frequency (the frequency 4) is decreased only approximately 20% as illustrated in FIG. 5. Therefore, although the rotary shaft 3 is rotated at the expected stable rotation speed calculated so as to be capable of suppressing tentatively the "chatter vibration", there might be a situation that the frequency-domain vibrational acceleration exceeds again the threshold value, that is, the "chatter vibration" might be generated intermittently. Therefore, the control device 5 controls a rotating operation of the rotary shaft 3 referring to a flowchart illustrated in FIG. 8 after the rotary shaft 3 is rotated at the expected stable rotation speed. In addition, a reference numeral 6 in FIG. 5 indicates the rotation speed.

As aforementioned, even during the rotation at the expected stable rotation speed, the FFT calculating unit 11 continues Fourier-analysis, and calculation of the maximum acceleration and the frequency 4 (chatter frequency) at the maximum acceleration about the time-domain vibrational accelerations constantly detected during the rotation of the rotary shaft 3 by the vibration sensors 2a to 2c (S11). Further, the calculating unit 12 compares the frequency-domain vibrational acceleration calculated in the FFT calculating unit 11 with the predetermined threshold value (S12). In the case where it is detected that the frequency-domain vibrational acceleration exceeds again the predetermined threshold value, the calculating unit 12 determines an increase or decrease of the rotation speed of the rotary shaft 3 based on a following relationship between a decimal part of the k' number stored in the storage unit 14 and a predetermined changing-direction determining threshold value (for example, 0.5), and commands the NC device 13 to finely change the rotation speed based on the determination (S13). Then, the NC device 13 finely changes the rotation speed of the rotary shaft 3 according to a command from the calculating unit 12. Here, the relationship between the decimal part of the k' number and the predetermined changing-direction determining threshold value means that the rotation speed is made to be decreased in the case where the decimal part of the k' number is equal to or larger than the changing-direction determining threshold value, and the rotation speed is made to be increased in the case where the decimal part of the k' number is less than the changing-direction determining threshold value. Further, an amount of change when finely changing the rotation speed is set to be approximately several % of the rotation speed (for example, 2%).

Further, in the vibration suppressing device 10, the FFT calculating unit 11 and the calculating unit 12 also continue Fourier-analysis and comparison between the frequency-domain vibrational acceleration and the predetermined threshold value like in S11 and S12 after finely changing the rotation speed (S14). Further, when it is detected that the vibrational acceleration exceeds again the predetermined threshold value, the calculating unit 12 calculates a k" number by the same calculation formula as calculation formula (1) with the rotation speed after being finely changed, a chatter frequency at the vibrational acceleration exceeding the predetermined threshold value in S14, and the number of the tool flutes (S15). Further, the calculating unit 12 acquires an amount of change by following calculation formula (I) with the calculated k" number and the k' number stored in the storage unit 14.

amount of change=k' number−k" number   Calculation formula (I):

Further, the calculating unit 12 compares the amount of change with a predetermined phase threshold value (for example, 0.4) (S16). In the case where the amount of change does not exceed the phase threshold value, the calculating unit 12 overwrites and updates the measured k" number as the k' number in the storage unit 14 (S17). Then, after returning to S13, the calculating unit 12 further finely changes the rotation speed. While continuing monitoring based on Fourier-analysis, the calculating unit 12 repeats the above control, that is, acquiring an amount of change when the "chatter vibration" is not suppressed.

On the other hand, when the amount of change exceeds the phase threshold value as a result of the comparison in S16, and when the "chatter vibration" is not detected as a result of a fine change of the rotation speed (that is, in the case where the frequency-domain vibrational acceleration exceeding the predetermined threshold value has not been detected), with determining that the rotation speed is the stable rotation speed, the calculating unit 12 outputs a command to the NC device 13 to keep the rotation speed (S18). Further, upon reception of the output from the calculating unit 12 concerning for keeping of the rotation speed, the NC device 13 keeps the rotation speed of the rotary shaft 3 at the outputted rotation speed (that is, at the stable rotation speed). As a result, a stable machining state with the suppressed "chatter vibration" is kept.

Figure 6:
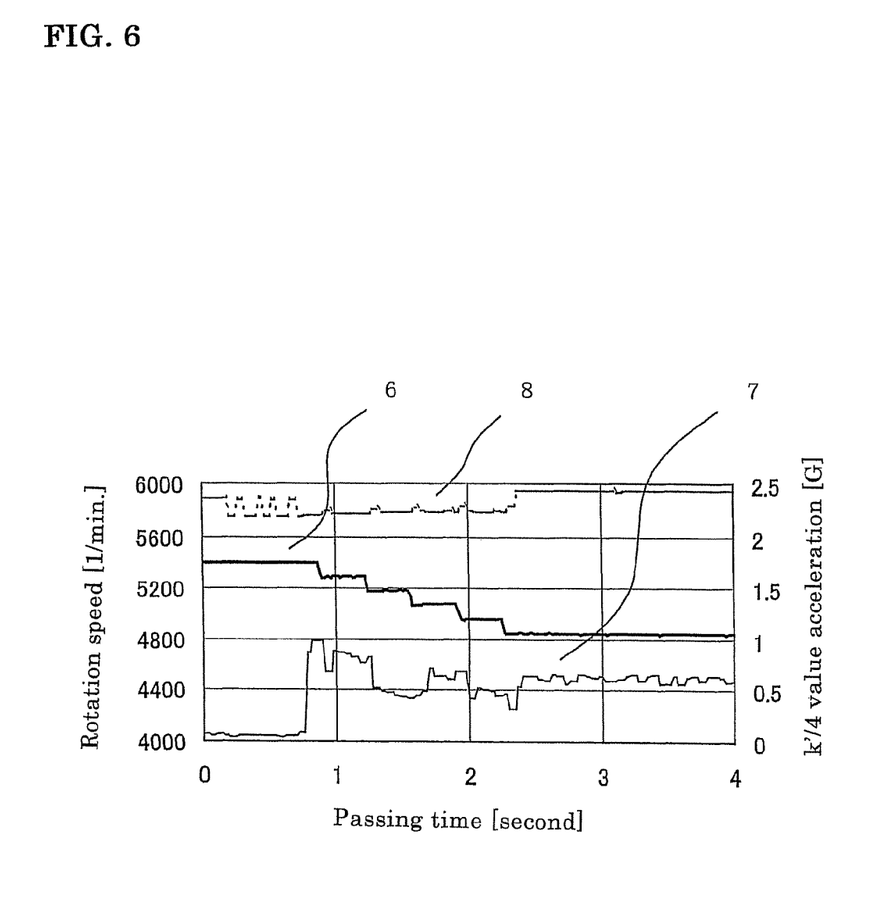
FIG. 6 is an explanatory view for illustrating a change of vibrational acceleration at a chatter frequency when the rotation speed of the rotary shaft is further finely changed after corresponding the rotation speed of the rotary spindle to the expected stable rotation speed.

When machining is performed while finely changing the rotation speed of the rotary shaft 3 as above described, the vibrational acceleration 7 in the chatter frequency can be decreased at least approximately 40% as illustrated in FIG. 6. That is, theoretically, the rotation speed has a smallest "regenerative chatter vibration" in which a phase is 2π (a decimal part of the k' number=0). However, the rotation speed does not necessarily coincide with the stable rotation speed due to a calculation error and the like even when the rotation speed having the phase of 2π (the expected stable calculation speed) is calculated. Therefore, the rotation speed where the phase is changed from around 2π to 0, that is, the rotation speed having an amount of change and a chatter frequency to be greatly changed is the stable rotation speed which can suppress the "regenerative chatter vibration" most effectively. Thus, in the vibration suppressing device 10, it is possible to acquire an accurate stable rotation speed by finely changing the rotation speed of the rotary shaft 3 from the expected stable rotation speed.

As described above, according to the vibration suppressing device 10 and the vibration suppressing method with the vibration suppressing device 10, the stable rotation speed is acquired by finely changing the rotation speed of the rotary shaft 3 based on the expected stable rotation speed and calculating the amount of change of the k' number or the like. Thus, a more accurate stable rotation speed can be acquired and "chatter vibration" generated during machining can be suppressed more effectively than a conventional method. As a result, a quality of a workpiece surface can be improved, and a tool wear can be suppressed.

A Second Embodiment

The storage unit 14 of the control device 5 of the vibration suppressing device 10 according to a second embodiment of the present invention stores an initial value ($\epsilon 0=1$) of the phase $\epsilon 0$. Other configurations of the vibration suppressing device 10 according to the second embodiment of the present invention are the same as those of the first embodiment of the present invention.

Here, a vibration suppressing method of "chatter vibration" by the vibration suppressing device 10 will be described referring to a flowchart in FIG. 11.

Figure 11:
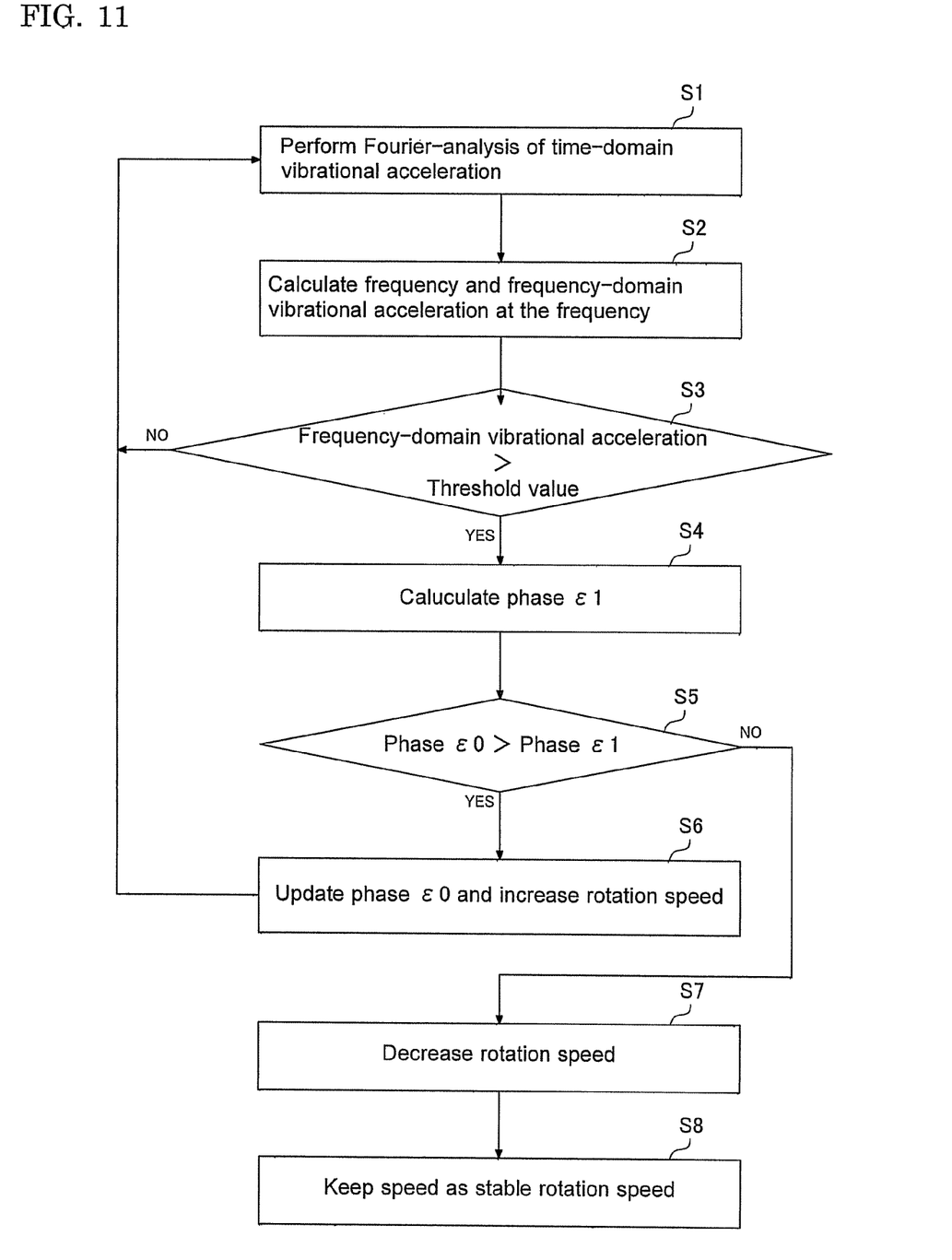
FIG. 11 is a flowchart according to a vibration suppressing control in the present embodiment.

At the beginning of machining, the control device 5 controls the rotating operation of the rotary shaft 3 based on the flowchart in FIG. 11.

First, the FFT calculating unit 11 performs Fourier-analysis of the time-domain vibrational accelerations which are constantly detected during the rotation of the rotary shaft 3 by the vibration sensors 2a to 2c (S1), and constantly calculates a maximum acceleration (a frequency-domain vibrational acceleration) and a frequency 4 (a chatter frequency) of the maximum acceleration as shown in FIG. 4 (S2). In addition, when the time-domain vibrational accelerations are subjected to Fourier-analysis, peaks having a plurality of patterns illustrated in FIG. 4 are acquired. These peaks indicate a relationship between a frequency and a frequency-domain vibrational acceleration. In the present embodiment, a peak having the maximum frequency-domain vibrational acceleration is used.

Then, the calculating unit 12 compares the frequency-domain vibrational acceleration calculated in the FFT calculating unit 11 with a predetermined threshold value (S3). With an assumption of that "chatter vibration" to be suppressed is generated at the rotary shaft 3 in the case where the frequency-domain vibrational acceleration exceeds the predetermined threshold value (for example, the frequency-domain vibrational acceleration in the frequency 4 in FIG. 4 is detected), the calculating unit 12 calculates the phase $\epsilon 1$ by following calculation formula (4) (S4).

phase $\epsilon 1$=decimal part of {60×chatter frequency/(the number of tool flutes×rotation speed)  Calculation formula (4):

Here, it is assumed that "the number of the tool flutes" in calculation formula (4) is previously set in the calculating unit 12. Further, "a rotation speed" in calculation formula (4) is a current rotation speed. Furthermore, a chatter frequency is a frequency 4 when "chatter vibration" is generated.

Further, the calculating device 12 compares the calculated phase $\epsilon 1$ with the phase $\epsilon 0$ stored in the storage unit 14 (S5). In the case where "chatter vibration" is detected for a first time after starting the rotation of the rotary shaft 3, the phase $\epsilon 0$ is an initial value (that is, $\epsilon 0=1$). Thus, $\epsilon 1$ is always less than $\epsilon 0$ (the determination in S5 is YES). When the calculated phase $\epsilon 1$ is smaller than the phase $\epsilon 0$ stored in the storage unit 14 in this manner, the storage unit 14 updates and stores a value of the phase $\epsilon 1$ currently calculated as the phase $\epsilon 0$, and the NC device 13 increases the rotation speed by a predetermined amount of change (S6). In addition, the amount of change is previously stored and, for example, this amount of change is defined as a value of several % (for example, 3%) of the rotation speed set at the time of starting machining.

Then, after the change of the rotation speed as described above, returning to S1, the FFT calculating unit 11 continues the Fourier-analysis of the vibrational acceleration in times domains constantly detected in the rotary shaft 3 during rotation at the changed rotation speed, and the calculation of a maximum acceleration and the frequency 4 (the chatter frequency) at the maximum acceleration, and the calculating unit 12 compares the frequency-domain vibrational acceleration calculated in the FFT calculating unit 11 with a predetermined threshold value (S3). Here, when it is detected that the vibrational acceleration exceeds again the predetermined threshold value (the determination in S3 is YES), the calculating unit 12 recalculates the phase $\epsilon 1$ using calculation formula (4) (S4), and compares the phase s1 currently calculated with the phase $\epsilon 0$ previously updated (S5). In the case where the phase $\epsilon 1$ currently calculated is smaller than the phase $\epsilon 0$ previously updated, the storage unit 14 updates the phase $\epsilon 0$ (that is, updates the phase $\epsilon 0$ into the value of the phase $\epsilon 1$ currently calculated), and the NC device 13 controls the rotation speed to be increased (S6). Further, these steps from S1 to S6 are repeated until the determination in S6 becomes NO, that is, until the phase $\epsilon 1$ becomes equal to or larger than the phase $\epsilon 0$. In addition, in the case where the "chatter vibration" is not detected as a result of increasing the rotation speed in S6 (that is, the determination in S3 has not been YES yet), the increased rotation speed is kept as the stable rotation speed until machining ends.

On the other hand, in the case where the "chatter vibration" is generated at the increased rotation speed and the phase $\epsilon 1$ currently calculated becomes equal to or larger than the phase $\epsilon 0$, that is, in the case where the determination in S6 is NO, the NC device 13 decreases the rotation speed by an amount of change which is previously increased (S7). That is, the fact that the phase $\epsilon 1$ currently calculated is equal to or larger than the phase $\epsilon 0$ stored in the storage unit 14 (that is, the phase $\epsilon 1$ previously calculated) means that the phase $\epsilon 0$ is the smallest as the phase value. Thus, the NC device 13 returns the rotation speed of the rotary shaft 3 to a rotation speed of a previous step (the last rotation speed) where the phase value becomes the smallest. Then, the decreased rotation speed is kept as the stable rotation speed until machining ends (S8).

Figure 9:
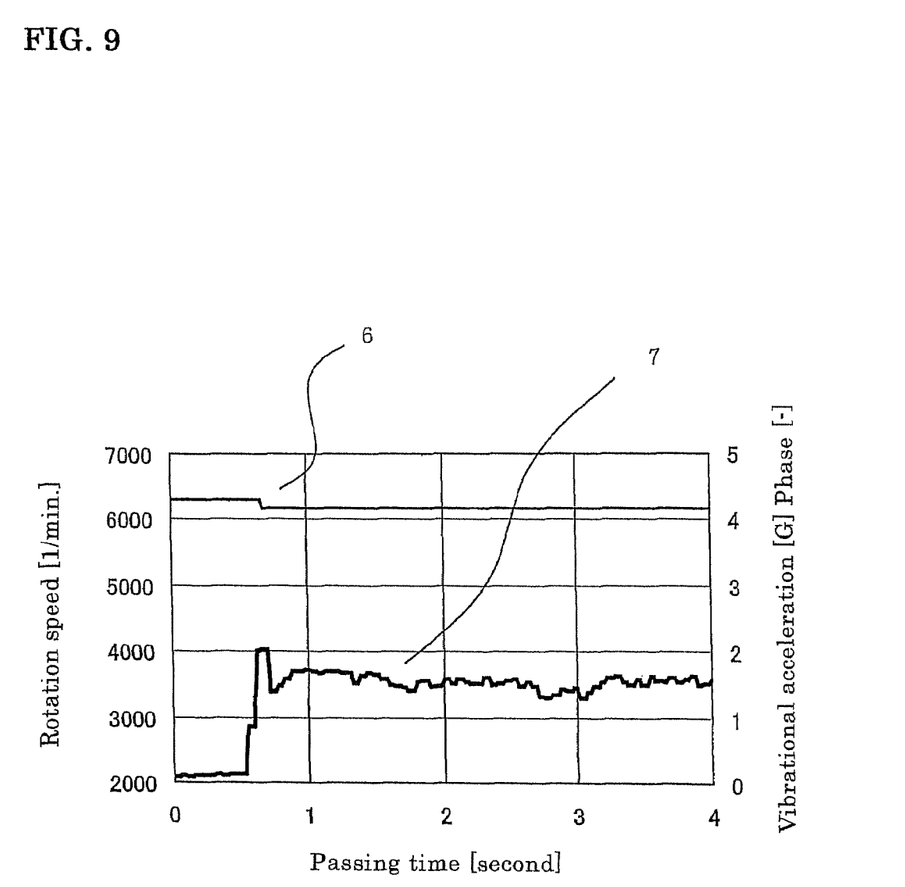
FIG. 9 is an explanatory view for illustrating a change of a vibrational acceleration in a chatter frequency in a conventional vibration suppressing control.
Figure 10:
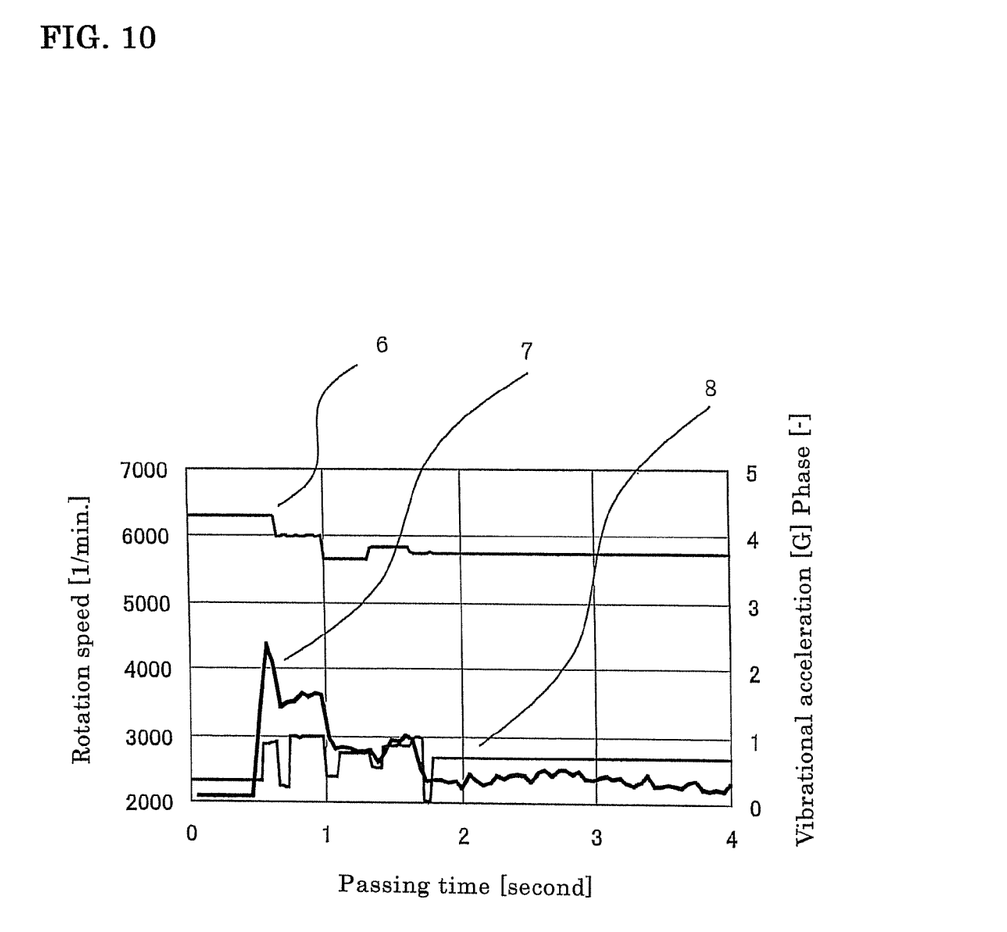
FIG. 10 is an explanatory view for illustrating a change of vibrational acceleration in a chatter frequency in a vibration suppressing control in the present embodiment.

Here, the suppressing results of "chatter vibration" in the case of increasing and decreasing the rotation speed of the rotary shaft 3 as described above and those in the case of changing the rotation speed only once like a conventional method will be considered referring to FIGS. 9 and 10.

Upon reception of a detection of "chatter vibration", even if the rotation speed of the rotary shaft 3 is changed into a rotation speed being ideal as a theoretical value based on a result of the detection (or a result of an old experiment) like a conventional method, the vibrational acceleration 7 in a chatter frequency (the frequency 4) is decreased only approximately 10% due to an error of a detected value of vibration, a control error of the rotation speed, and the like (FIG. 9). That is, there might be a situation that the "chatter vibration" is generated intermittently after changing the rotation speed.

On the other hand, as aforementioned, when the control such that the rotation speed is changed at every reception of the detection of the "chatter vibration" and the eventual rotation speed having a smallest value of the phase is kept as a stable rotation speed is executed, the vibrational acceleration 7 in the chatter frequency can be decreased at least approximately 40% as illustrated in FIG. 10. In addition, in FIGS. 9 and 10, numeral 6 indicates change of a rotation speed, numeral 7 indicates change of vibrational acceleration in a chatter frequency, and numeral 8 indicates change of a phase, respectively.

According to the vibration suppressing device 10 and the vibration suppressing method with the vibration suppressing device 10 as described above, when "chatter vibration" is generated, the phase ϵ1 at the rotation speed is calculated, the phase ϵ1 is compared with the phase ϵ0 at the previous rotation speed, and then the rotation speed of the rotary shaft is changed according to a result of the comparison. Thus, a correspondence according to a situation can be performed, and an influence of "generative chatter vibration" can be suppressed more than a conventional method.

Particularly, when the phase ϵ1 at the current rotation speed is compared with the phase ϵ0 at the previous rotation speed and becomes equal to or larger than the phase ϵ0, the rotation speed is changed into the previous rotation speed (that is, the rotation speed at the time of calculating the phase ϵ0). Thereby, machining can be performed at the rotation speed having a smallest phase value. Therefore, generation of the "regenerative chatter vibration" can be suppressed more effectively, which improves a quality of a workpiece surface and suppresses a tool wear and the like.

In addition, the configuration according to the vibration suppressing method and the device of the present invention is not limited to the each aforementioned embodiment. The configurations according to the detection of the chatter frequency and the control of vibration suppressing can be properly changed if necessary within a range to achieve the purpose of the present invention.

For example, the aforementioned first embodiment has a configuration in which the rotation speed of the rotary shaft is finely changed when "chatter vibration" is intermittently detected. However, a ratio of change of the rotation speed in this configuration may be changed according to the value of the rotation speed, the number of the tool flutes, dynamic characteristics, and the like, before changing. That is, in the case where the rotation speed is low, the effect can be acquired even with an amount of change of approximately 10 $min^{-1}$. On the other hand, the higher the rotation speed becomes, the more stable/unstable regions are enlarged so that there may be a case that a vibration suppressing effect cannot be fully acquired without changing the rotation speed for approximately 20 to 30%. Therefore, the amount of change of the rotation speed can be properly changed according to the aforementioned conditions.

Further, various kinds of threshold values previously set to be used in calculation formulae (1) to (4) can be properly checked and determined according to a kind of a machine tool (for example, in the aforementioned first embodiment, a phase threshold value can have a value within a range from 0.2 to 0.6, and different values can be adopted according to a size and a kind of a tool and a work). Further, in the aforementioned first embodiment, upon acquisition of an amount of change to be compared with a phase threshold value, an actual change of the k' number by a difference (calculation formula (4)) is acquired, however, it may be possible that a changing ratio is acquired by differentiation and compared with the phase threshold value as an amount of change. In addition, instead of using the amount of change of the k' number, it is possible to adopt an amount of change of chatter frequencies before and after changing the rotation speed as an amount of change to be compared with the phase threshold value.

Further, in the aforementioned first embodiment, vibration suppressing is controlled using a peak having a maximum frequency-domain vibrational acceleration among peaks having a plurality of patterns acquired by Fourier-analysis of the time-domain vibrational acceleration. However, it may be possible that a suppressing effect of the "chatter vibration" is improved more by calculating an expected stable rotation speed using a plurality of peaks (for example, three peaks) which have upper values of the frequency-domain vibrational acceleration.

Furthermore, in the aforementioned first embodiment, a vibration sensor is used as a detection unit. However, a detection unit capable of detecting displacement of a rotary shaft or sound pressure due to vibration can be adopted instead of the vibration sensor. Further, even when the vibration sensor is used, the expected stable rotation speed can be acquired not by detecting vibration on a rotating side (that is, the rotary shaft) as described in the aforementioned first embodiment but by detecting vibration on a not-rotating side.

In addition, the vibration suppressing device according to the present invention can suppress vibration of the machine tool such as a lathe for rotating the work other than the vibration of a machining center for machining by rotating the tool. Further, it is needless to say that a providing position or the number of detection units can be properly changed according to a kind and a size of the machine tool.

On the other hand, in the aforementioned second embodiment, the rotation speed of the rotary shaft 3 is changed according to the value of the phase ϵ1 to be calculated. However, it would be better that a ratio of change of the rotation speed in this configuration may be changed according to a value of the preset rotation speed, the number of the tool flutes, dynamic characteristics, and the like. That is, when the rotation speed is low, an effect can be acquired even at an amount of change of approximately 10 $min^{-1}$. On the other hand, when the higher the rotation speed becomes, the more stable/unstable regions are enlarged. Thus, there may be a case that a vibration suppressing effect cannot be fully acquired without changing the rotation speed for approximately 20 to 30%. Therefore, the amount of change of the rotation speed may be properly changed according to the aforementioned conditions.

Further, in the aforementioned second embodiment, in the case where the calculated phase ϵ1 does not exceed the phase ϵ0, the rotation speed is increased. However, depending on the initially set rotation speed and various conditions, the rotation speed may be decreased by a predetermined amount of change in the case where the determination in S6 is YES. At the time of this control, when the eventual phase ϵ1 becomes equal to or larger than the phase ϵ0, the rotation speed is increased by a predetermined amount of change and this rotation speed is kept as the stable rotation speed.

Further, although the rotation speed having the phase of 2π is a rotation speed having a smallest "generative chatter vibration" as described in the document of background art and the like, a process for guiding a theoretical formula includes a calculation error. Thus, when the rotation speed having the phase of 2π is acquired, the value is not necessarily the stable rotation speed. Therefore, a more proper stable rotation speed can be acquired by correcting and calculating a phase using following calculation formula (5) instead of calculation formula (4).

ϵ1=decimal part of {60×chatter frequency/(the number of tool flutes×rotation speed)+$A$}    Calculation formula (5):

Here, "A" in calculation formula (5) is a predetermined constant and a value closer to 0 (for example, 0.1) is used.

Further, in the aforementioned second embodiment, vibration suppressing is controlled using a peak having a maximum frequency-domain vibrational acceleration among peaks having a plurality of patterns acquired by Fourier-analysis of a time-domain vibrational acceleration. However, it may be possible to improve the "chatter vibration" suppressing effect by calculating an expected stable rotation speed using a plurality of peaks (for example, three peaks) which have upper values of the frequency-domain vibrational acceleration.

Furthermore, although, in the aforementioned second embodiment, a vibration sensor is used as a detection unit, a detection unit capable of detecting displacement of a rotary shaft or sound pressure due to vibration can be adopted instead of the vibration sensor. Further, even when the vibration sensor is used, the expected stable rotation speed can be acquired by not detecting vibration on a rotating side (that is, a rotary shaft) as described in the aforementioned second embodiment but detecting vibration on a not-rotating side.

What is claimed is:

1. A vibration suppressing method for suppressing chatter vibration generated upon rotation of a rotary shaft in a machine tool including the rotary shaft for rotating a tool or a work, the method comprising:
    a first step for detecting a time-domain vibration due to the rotary shaft during rotation;
    a second step for calculating a chatter frequency and a frequency-domain vibrational acceleration at the chatter frequency based on the detected time-domain vibration;
    a third step for calculating a k number and a k' number by following calculation formulae (1) and (2) and storing these numbers as machining information where the calculated frequency-domain vibrational acceleration exceeds a predetermined threshold value;
    a fourth step for calculating an expected stable rotation speed by following calculation formula (3) using the calculated k number and corresponding rotation speed of the rotary shaft for the expected stable rotation speed;
    a fifth step for changing the rotation speed of the rotary shaft from the expected stable rotation speed where the frequency-domain vibrational acceleration exceeds again the predetermined threshold value in the rotary shaft during rotation at the expected stable rotation speed;
    a sixth step for calculating a k" number using calculation formula (1) with the expected stable rotation speed, where the frequency-domain vibrational acceleration further exceeds the predetermined threshold value after executing the fifth step;
    a seventh step for comparing an amount of change being a difference between the calculated k" number and the k' number stored as machining information with a predetermined phase threshold value, and updating the k" number as the k' number where the amount of change does not exceed the phase threshold value; and
    an eighth step for changing the rotation speed of the rotary shaft, calculating the k" number, and updating the k' number until the amount of change exceeds the phase threshold value, and keeping the rotation speed when the amount of change exceeds the phase threshold value as a stable rotation speed:

$k'$ number={60×chatter frequency/(the number of tool flutes×rotation speed)};     Calculation formula (1):

k number=integer part of $k'$ number;     Calculation formula (2):

and expected stable rotation speed=60×chatter frequency/ {the number of tool flutes× ($k$ number+1)}     Calculation formula (3).

2. The vibration suppressing method according to claim 1, further comprising:
    comparing a decimal part of the k' number and a predetermined changing-direction determining threshold value, and
    determining an increase and a decrease of the rotation speed upon changing of the rotation speed in the fifth step.

3. The vibration suppressing method according to claim 1, further comprising:
    comparing a decimal part of the k' number and a predetermined changing-direction determining threshold value, and determining an increase and a decrease of the rotation speed upon changing of the rotation speed in the fifth step.

4. A vibration suppressing method for suppressing chatter vibration generated upon rotation of a rotary shaft in a machine tool including the rotary shaft for rotating a tool or a work, the method comprising:
    a first step for detecting a time-domain vibration due to the rotary shaft during rotation;
    a second step for calculating a chatter frequency and a frequency-domain vibrational acceleration at the chatter frequency based on the detected time-domain vibration;
    a third step for calculating a k number and a k' number by following calculation formulae (1) and (2) and storing the chatter frequency as machining information where the calculated frequency-domain vibrational acceleration exceeds a predetermined threshold value;
    a fourth step for calculating an expected stable rotation speed by following calculation formula (3) using the calculated k number and corresponding rotation speed of the rotary shaft for the expected stable rotation speed;
    a fifth step for changing the rotation speed of the rotary shaft from the expected stable rotation speed where the frequency-domain vibrational acceleration exceeds again the predetermined threshold value in the rotary shaft during rotation at the expected stable rotation speed; and
    a step for acquiring an amount of change between a current chatter frequency and the chatter frequency stored as the machining information where the frequency-domain vibrational acceleration further exceeds the predetermined threshold value after executing the fifth step, changing the rotation speed until the amount of change exceeds a predetermined phase threshold value, and keeping the rotation speed when the amount of change exceeds the predetermined phase threshold value as a stable rotation speed:

$k'$ number={60×chatter frequency/(the number of tool flutes×rotation speed)};     Calculation formula (1):

k number=integer part of $k'$ number;     Calculation formula (2):

and expected stable rotation speed=60×chatter frequency/ {the number of tool flutes× ($k$ number+1))     Calculation formula (3).

5. A vibration suppressing device for suppressing chatter vibration generated upon rotation of the rotary shaft in a machine tool comprising the rotary shaft for rotating a tool or a work, the device comprising:
    a detection unit to detect a time-domain vibration of the rotary shaft during rotation;
    a first calculating unit to calculate a chatter frequency and a frequency-domain vibrational acceleration at the chatter frequency based on the detected time-domain vibration;

a second calculating unit to calculate a k number and a k' number by following calculation formulae (1) and (2), and calculating an expected stable rotation speed by following calculation formula (3) where the calculated frequency-domain vibrational acceleration exceeds a predetermined threshold value, respectively;

a storage unit to store the k number and the k' number as machining information; and a rotation speed control unit to control the rotation speed of the rotary shaft, wherein:

where the frequency-domain vibrational acceleration exceeds again the predetermined threshold value in the rotary shaft during rotation at the expected stable rotation speed calculated by the second calculating unit, the device changes the rotation speed of the rotary shaft from the expected stable rotation speed acquires an amount of change between a current chatter frequency and the chatter frequency stored as the machining information in the case where the frequency-domain vibrational acceleration further exceeds the predetermined threshold value, changes the rotation speed until the amount of change exceeds a predetermined phase threshold value, and keeps the rotation speed when the amount of change exceeds the predetermined phase threshold value as a stable rotation speed:

$k'$ number={60×chatter frequency/(the number of tool flutes×rotation speed)}   Calculation formula (1):

$k$ number=integer part of $k'$ number   Calculation formula (2):

Expected stable rotation speed=60×chatter frequency/{the number of tool flutes×($k$ number+1)}   Calculation formula (3).

6. A vibration suppressing method for suppressing chatter vibration in a machine tool including the rotary shaft for rotating a tool or a work by changing a rotation speed of a rotary shaft upon generation of the chatter vibration at the rotary shaft during rotation, the method comprising:

a step A for detecting a time-domain vibration due to the rotary shaft during rotation;

a step B for calculating a chatter frequency and a frequency-domain vibrational acceleration at the chatter frequency based on the detected time-domain vibration;

a step C for calculating a phase $\epsilon 1$ by following calculation formula (4) in the case where the calculated frequency-domain vibrational acceleration exceeds a predetermined threshold value;

a step D for comparing the calculated phase $\epsilon 1$ with a phase $\epsilon 0$ calculated by calculation formula (4) in a same way as calculating the phase $\epsilon 1$ and stored in the case where a vibrational acceleration previously exceeds a predetermined threshold value; and a step E for changing a rotation speed of the rotary shaft according to the comparison result by the step D:

Phase $\epsilon 1$=decimal part of {60×chatter frequency/(the number of tool flutes×rotation speed)   Calculation formula (4).

7. The vibration suppressing method according to claim 6, further comprising:

updating and storing the phase $\epsilon 1$ currently calculated as the phase $\epsilon 0$ in the step E in the case where the calculated phase $\epsilon 1$ is smaller than the phase $\epsilon 0$ previously calculated as a result of the comparison in the step D, and changing the rotation speed of the rotary shaft by a predetermined amount of change; or changing the rotation speed of the rotary shaft into the rotation speed at a time of calculating the phase $\epsilon 0$ in the step E in the case where the calculated phase $\epsilon 1$ is equal to or larger than the phase $\epsilon 0$ previously calculated as a result of the comparison in the step D.

8. A vibration suppressing device for suppressing chatter vibration in a machine tool including the rotary shaft for rotating a tool or a work by changing a rotation speed of a rotary shaft upon generation of chatter vibration at the rotary shaft during rotation, the device comprising:

a detection unit to detect a time-domain vibration due to the rotary shaft during rotation;

a calculating unit A to calculate a chatter frequency and a frequency-domain vibrational acceleration at the chatter frequency based on the detected time-domain vibration;

a calculating unit B to calculate a phase $\epsilon 1$ by following calculation formula (4) in the case where the calculated frequency-domain vibrational acceleration exceeds a predetermined threshold value;

a storage unit to store a phase $\epsilon 0$ calculated by the calculating unit B with calculation formula (4) in a same way as calculating the phase $\epsilon 1$ when the vibrational acceleration previously exceeds the predetermined threshold value;

a control unit to compare the calculated phase $\epsilon 1$ with the phase $\epsilon 0$ stored in the storage unit upon calculation of the phase $\epsilon 1$ by the calculating unit B, and commanding a change of the rotation speed of the rotary shaft according to a result of the comparison; and a rotation speed control unit to control the rotation speed of the rotary shaft:

Phase $\epsilon 1$=decimal part of {60×chatter frequency/(the number of tool flutes×rotation speed)   Calculation formula (4).

* * * * *